United States Patent
Morris

[11] 3,758,159
[45] Sept. 11, 1973

[54] VEHICLE SEAT CONSTRUCTION

[75] Inventor: Anthony R. Morris, Northampton, England

[73] Assignee: Universal Oil Products Company, Des Plaines, Ill.

[22] Filed: Mar. 12, 1971

[21] Appl. No.: 123,802

[30] Foreign Application Priority Data
Mar. 11, 1970 Great Britain.................. 11,604/70

[52] U.S. Cl.................. 297/455, 5/353.2, 297/458, 297/460
[51] Int. Cl............................................. A47c 7/14
[58] Field of Search ............................... A47c/7/20; B60n/1/06; 297/218, 214, 452, 454, 458, 466, DIG. 1, DIG. 2; 5/353.1; 264/45

[56] References Cited
UNITED STATES PATENTS

| | | | |
|---|---|---|---|
| 3,264,382 | 8/1966 | Angell et al. | 264/45 |
| 3,485,698 | 12/1969 | Marsh | 297/452 X |
| 3,556,594 | 1/1971 | Anderson | 297/452 |
| 3,393,941 | 7/1968 | Grosfillex | 297/457 X |
| 3,133,765 | 5/1964 | Kramer | 297/457 X |
| 3,647,260 | 3/1972 | Grant | 297/457 |
| 3,026,145 | 3/1962 | Galbraith | 297/455 |
| 3,341,251 | 9/1967 | Costin | 297/457 |

Primary Examiner—Casmir A. Nunberg
Attorney—James R. Hoatson, Jr. and Philip T. Liggett

[57] ABSTRACT

A seat pan for a vehicle seat is moulded from a rigid foam plastics and has an insert for coupling the pan to another part of the seat incorporated within the pan during the moulding process. The insert can comprise a pre-formed channel for receiving the edge portion of a seat cover or a suspension mounting.

3 Claims, 5 Drawing Figures

INVENTOR:
Anthony R. Morris

VEHICLE SEAT CONSTRUCTION

BACKGROUND OF THE INVENTION

1. Field of the Invention

This invention relates to seats, in particular for tractors, and more particularly to a seat in the form of an upholstered seat pan.

2. Description of the Prior Art

Seat pans are conventionally made in the form of a sheet metal shell shaped in one piece to form seat support and back support portions with a wrap-around portion on each side to fit snugly around the occupant of the seat, the latter assists in preventing lateral movement resulting from lateral shocks arising as a tractor moves over rough ground. Such a metal sheet pan conveniently has a plastic foam cushion extending over the whole of its surface directed towards the seat occupant and secured thereto, and this foam cushion in turn is covered by a durable skin of synthetic material which is permanently attached to the rim of the metal pan and to the foam cushion.

The production costs of such a seat pan however are relatively high, and a requirement exists for a cheaper form of construction.

SUMMARY OF THE INVENTION

According to the present invention, there is provided a seat comprising a seat pan moulded from rigid plastics material, and an insert for coupling the pan to another part of the seat, the insert beig anchored in the plastics material during the moulding thereof.

Further according to the present invention, there is provided a seat comprising a rigid foam plastics seat pan formed by a moulding process, a cushion supported by the seat pan, a seat cover having an edge portion, and a channel strip extending around the periphery of the of the seat pan and incorporated therein during the moulding process, the edge portion of the seat cover being retained in the channel strip.

According to another aspect of the invention, there is provided a method of manufacturing a seat having a moulded, rigid, plastics foam, seat pan, said method comprising the steps of incorporating, within the seat pan mould, an insert of a material stronger than the rigid plastics foam, and filling the mould with plastics foam to form the seat pan.

BRIEF DESCRIPTION OF THE DRAWINGS

Embodiments of the invention will now be described by way of example only, with reference to the accompanying drawings in which.

DESCRIPTION OF THE PREFERRED EMBODIMENTS

Figure 1:
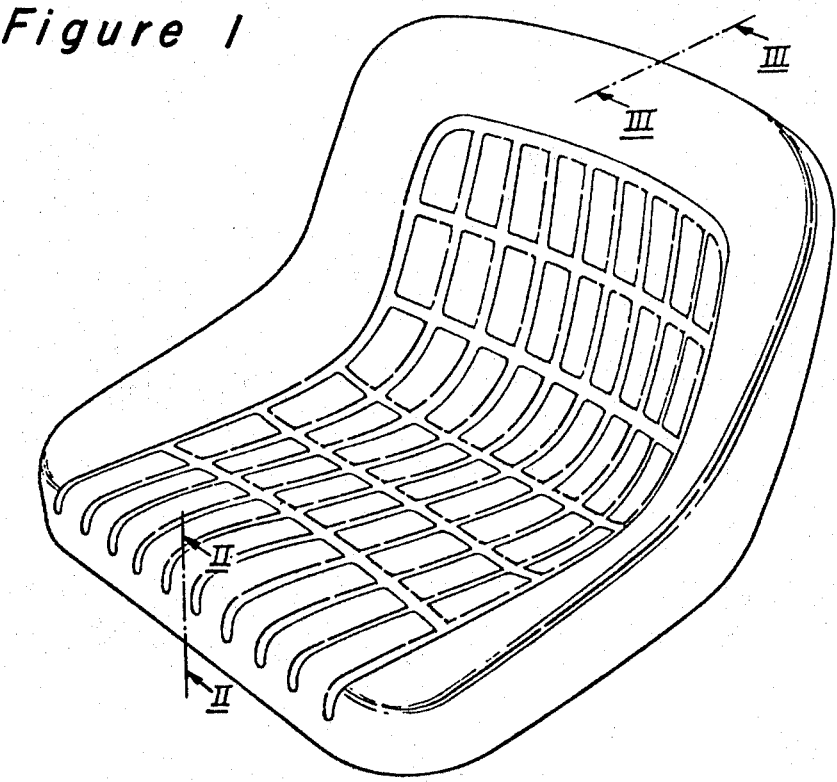
FIG. 1 is a perspective view of a seat in accordance with the invention.
Figure 2:
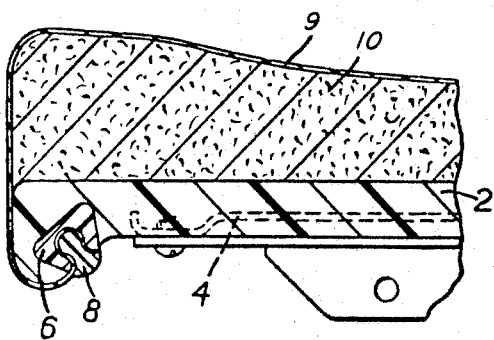
FIG. 2 is a fragmentary section taken on line II—II of FIG. 1.
Figure 3:
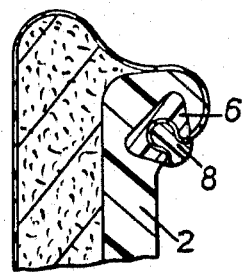
FIG. 3 is a fragmentary section taken on line III—III in FIG. 1.
Figure 4:
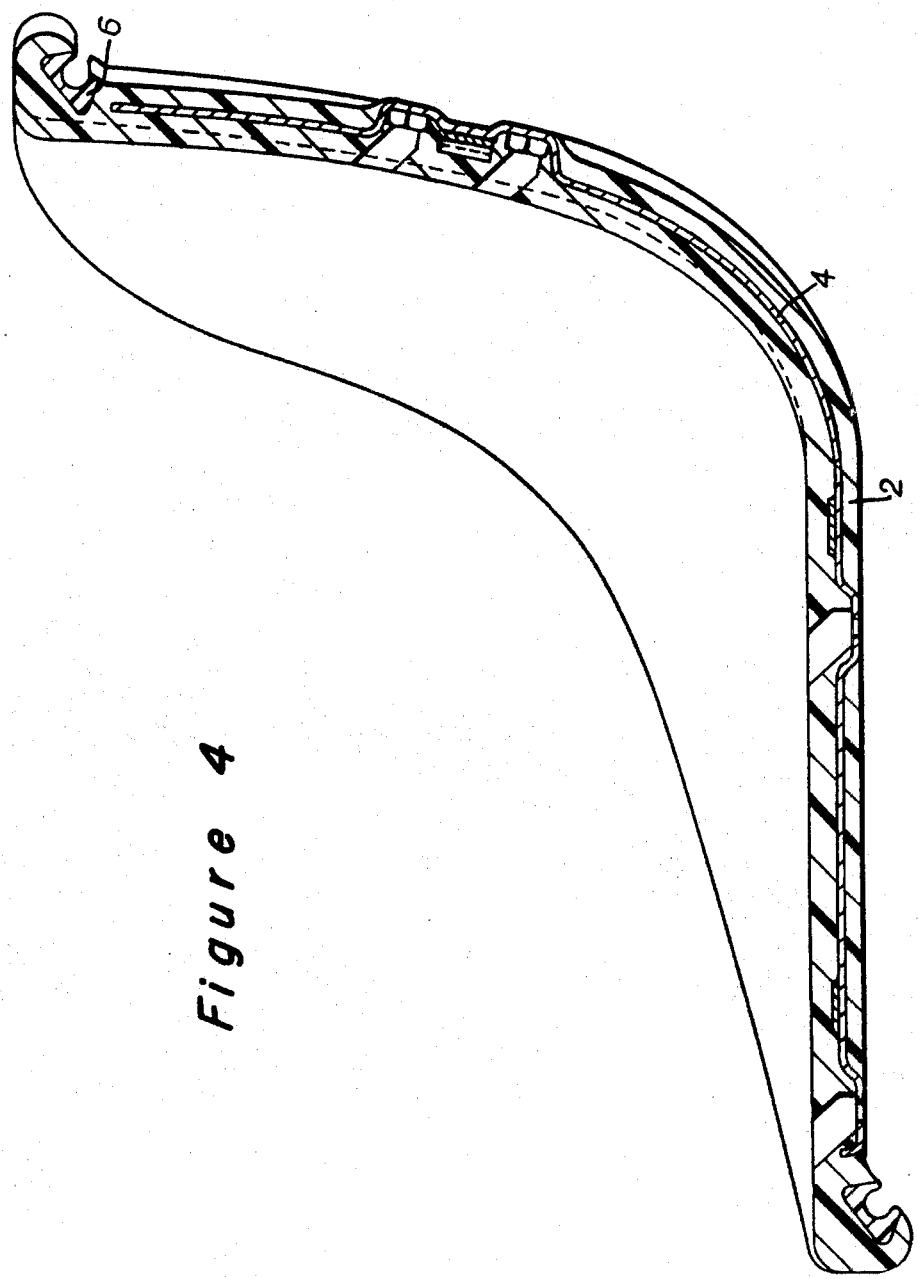
FIGS. 4 and 5 are sections through modified forms of the seat.

The seats shown in the drawings each comprise a seat pan moulded in rigid plastics foam, for example rigid polyurethane foam which has the advantage of lightness, cheapness and relatively high strength or rigid ABS foam.

Those parts of the moulded plastics seat pan 2 which are subject to extra heavy load or shock are reinforced by an insert 4 of metal or of a tougher plastics material. Thus, for example, bearings which receive coupling arms, by means of which the seat pan is mounted for upward and downward movement relative to a base part, can be formed in metal or tough plastics and include a flat anchoring portion which is located within the mould for the seat pan so that it becomes an integral part of the seat pan during the moulding operation. These inserts 4 can be formed in one piece or separately.

In the embodiments shown in FIGS. 1 to 4, in order to provide a channel around the periphery of the seat into which the edge of a seat cover can be fitted and secured, a plastics insert 6 is first formed by extrusion in the shape of a channel of substantially dove-tail overall cross-section, the channel itself being of re-entrant shape. The plastics insert 6 is then fitted into the mould in which the seat pan is to be formed, and becomes an integral part of the seat pan during the moulding operation, the insert 6 being so located that is dove-tail shape prevents it from being pulled out of the edge of the moulded seat pan 2.

In fitting the plastic insert 6 in the mould, the insert 6 is fitted over a non-keying ridge on the inside of the mould, such that when the mould is parted, the ridge offers no restriction to the parting, and the moulding can be easily removed with the plastics section moulded into it.

In assembly of the seat, the seat cover, 9 which conveniently is formed integrally with the foam cushion 10 below it, is fitted over the obverse of the seat pan and the edge of the cover is folded around the rim of the seat pan and pressed into the channel of the plastics insert 6 on the reverse side of the rim. The edge of the seat cover is then anchored in this channel by the insertion of a retainer strip 8 or a plurality of retaining strips which engage tightly into the re-entrant channel of the insert 6.

Figure 5:
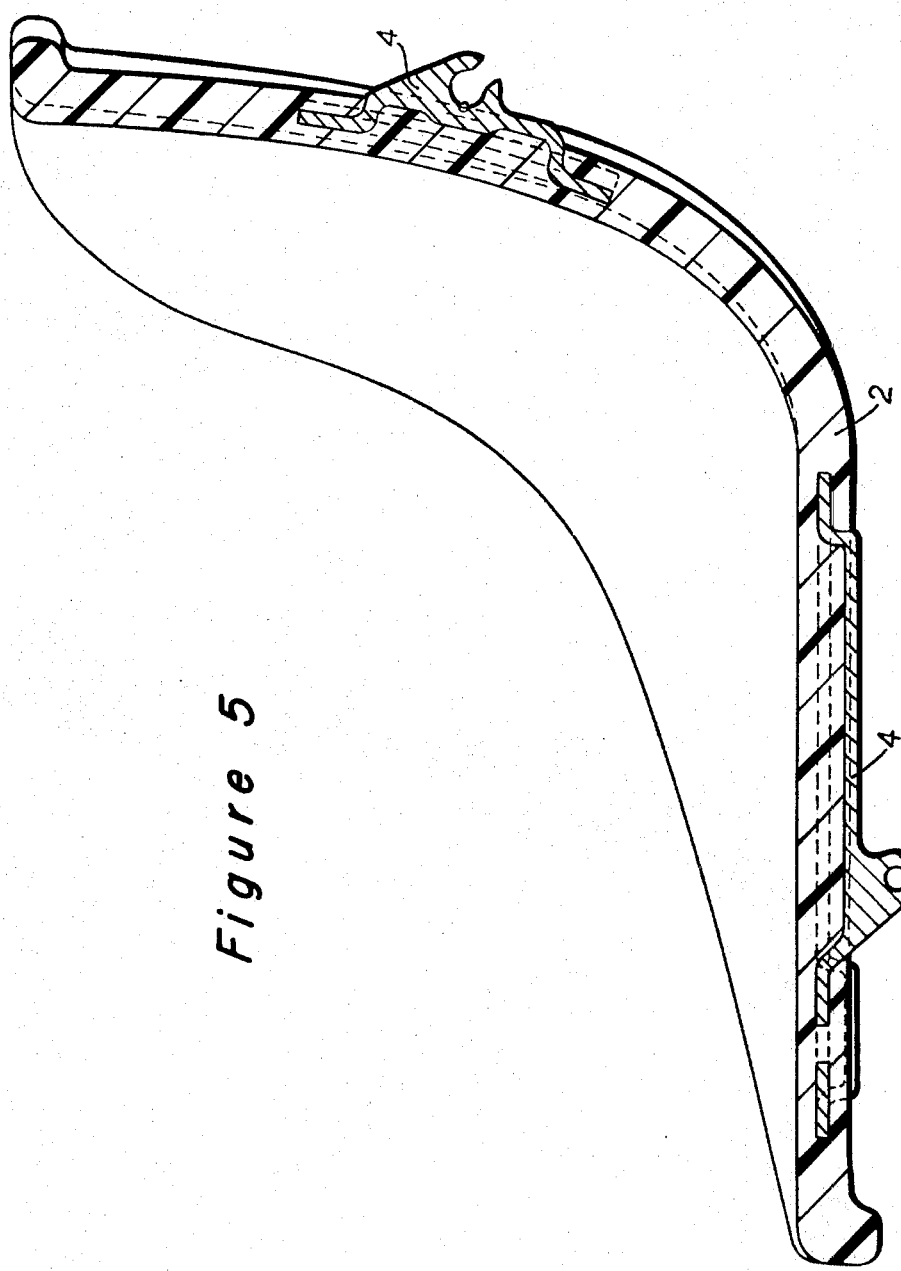

In a modification of the manufacturing process described above, to produce the seat shown in FIG. 5 use is made of a self-skinning flexible polyurethane foam which will form in one piece the foam cushion and the skin covering of the seat. In this event, the moulding of the cushion and skin can take place direclty on to the plastics seat pan 2 by providing one half of the mould of a shape to form the skin of the seat. The mould is preferably provided with raised portions to form grooves in the moulded upholstery and with a surface finish suitable to impart an imitation leather finish to the seat skin. The other half of the mould will be formed by the seat pan itself so that the foam is moulded directly onto the seat pan. It will be evident in this case that a release agent is applied only to the part of the mould which forms the shape of the seat cover or skin so that both the cushion and the edge of the skin will adhere to the seat pan 2. Sufficient adherence should be obtainable to avoid the need for other means of securing the edge of the seat skin to the seat pan and hence the cushion and skin are applied to the seat pan in a single moulding operation requiring only the removal of flashes and the like after opening of the mould.

If a cold-cure urethane foam is used which does not form a skin, the above process can still be applied to form the foam cushion directly on the seat pan 2, but a final operation of coating the foam cushion with a skin after removal of the foam and the seat pan 2 from the mould, will be necessary.

What is claimed is:

1. A seat comprising
a seat pan moulded from rigid plastics material, a seat cover, and
an insert comprising a preformed channel member extending around the periphery of the seat pan and having a reentrant shape for receiving and anchoring the edge portion of the seat cover, the insert being anchored in the plastics material during the moulding process thereof.

2. A seat comprising
a rigid foam plastics seat pan formed by a moulding process,
a cushion supported by the seat pan,
a seat cover having an edge portion, and
an extruded channel member having a reentrant shape extending around the periphery of the seat pan and incorporated therein during the moulding process, the edge portion of the seat cover being retained in the channel strip.

3. A seat in accordance with claim 2 wherein said seat pan has a generally L-shaped cross-section defining seat and back rest portions, said channel surrounding the periphery of the under and back sides of said seat and having its reentrant open portion accessible from a single direction throughout its length.

* * * * *